(12) United States Patent
Arsene et al.

(10) Patent No.: US 8,833,006 B2
(45) Date of Patent: Sep. 16, 2014

(54) SHEET METAL PLATE WITH RELIEFS FOR CREATING INDUSTRIAL FLOORING OVER WHICH TRUCKS ARE TO RUN, ENGRAVED CYLINDER FOR OBTAINING SUCH SHEET METAL PLATES BY ROLLING

(75) Inventors: Sylvie Arsene, Grenoble (FR); Pascale Favier, Beaumont (FR)

(73) Assignee: Constellium France, Paris (FR)

( * ) Notice: Subject to any disclaimer, the term of this patent is extended or adjusted under 35 U.S.C. 154(b) by 0 days.

(21) Appl. No.: 13/638,884

(22) PCT Filed: Mar. 23, 2011

(86) PCT No.: PCT/FR2011/000164
§ 371 (c)(1),
(2), (4) Date: Dec. 26, 2012

(87) PCT Pub. No.: WO2011/121191
PCT Pub. Date: Oct. 6, 2011

(65) Prior Publication Data
US 2013/0095343 A1  Apr. 18, 2013

(30) Foreign Application Priority Data
Apr. 1, 2010  (FR) ...................................... 10 01364

(51) Int. Cl.
| E04F 15/06 | (2006.01) |
| B21B 1/22 | (2006.01) |
| B21B 27/00 | (2006.01) |
| B60R 13/01 | (2006.01) |
| B62D 25/20 | (2006.01) |
| B44B 5/00 | (2006.01) |
| E04F 15/02 | (2006.01) |

(52) U.S. Cl.
CPC ....... *B62D 25/2054* (2013.01); *E04F 15/02188* (2013.01); *B21B 1/227* (2013.01); *B21B 27/005* (2013.01); *B60R 13/01* (2013.01); *B44B 5/0047* (2013.01)
USPC ................................................ 52/177; 52/316

(58) Field of Classification Search
USPC ............ 52/177, 180, 316; 404/19, 35, 36, 42, 404/44
See application file for complete search history.

(56) References Cited

U.S. PATENT DOCUMENTS 1,441,327 A * 1/1923 Blum .............................. 52/177
1,738,829 A   12/1929 Jones
(Continued)

FOREIGN PATENT DOCUMENTS

| FR | 2 747 948 | 10/1997 |
| JP | 10-235424 | 9/1998 |
| WO | WO 2006/029429 | 3/2006 |

*Primary Examiner* — Brian Glessner
*Assistant Examiner* — Adam Barlow
(74) *Attorney, Agent, or Firm* — Ladas & Parry LLP (57) ABSTRACT

Sheet metal plate for creating flooring, particularly of industrial vehicles, over which trucks are to run, having a plurality of patterns, the maximum height of said reliefs ranging between 0.2 and 1.5 mm, said reliefs having a friction surface which has a mean width of at least 1 mm, in which said reliefs are arranged in a plurality of aligned groups of reliefs all of the same shape, the same orientation, and with their centers of gravity substantially aligned in one and the same given direction (D), the minimum distance, measured in said direction (D), between two adjacent reliefs of one and the same aligned group being less than 6 mm. The direction (D) in which the aligned groups are aligned advantageously coincides with the direction (De) in which the trucks run.

23 Claims, 6 Drawing Sheets

(56) References Cited

U.S. PATENT DOCUMENTS

| | | | | |
|---|---|---|---|---|
| D140,624 S | * | 3/1945 | Harper | D25/160 |
| 3,627,502 A | * | 12/1971 | Rees et al. | 428/600 |
| 5,499,888 A | * | 3/1996 | Hawkes | 404/19 |
| 5,807,021 A | * | 9/1998 | Aaron | 404/19 |
| 6,074,127 A | * | 6/2000 | Suetsugu | 404/36 |
| D513,809 S | * | 1/2006 | Zimmerle et al. | D25/138 |
| 7,634,876 B2 | * | 12/2009 | Moller, Jr. | 52/177 |
| D623,317 S | * | 9/2010 | Moore | D25/138 |
| 8,061,927 B1 | * | 11/2011 | Martinez | 404/15 |
| 8,439,596 B1 | * | 5/2013 | Dvoracek | 404/19 |
| 2002/0018908 A1 | * | 2/2002 | Smith et al. | 428/600 |
| 2006/0265975 A1 | * | 11/2006 | Geffe | 52/177 |
| 2008/0134593 A1 | * | 6/2008 | Moller | 52/177 |

* cited by examiner

SHEET METAL PLATE WITH RELIEFS FOR CREATING INDUSTRIAL FLOORING OVER WHICH TRUCKS ARE TO RUN, ENGRAVED CYLINDER FOR OBTAINING SUCH SHEET METAL PLATES BY ROLLING

This application is a 371 of PCT/FR2011/000164, filed on Mar. 23, 2011, which claims priority to French patent application number 1001364, filed Apr. 1, 2010.

The invention relates to a sheet metal plate having on one side thereof a plurality of embossed patterns arranged periodically, each pattern being itself composed of one or more projections, which we call "reliefs". This sheet is intended for the production of floors, especially floors of industrial vehicles. The present invention relates more particularly to sheets for the flooring of refrigerated vehicles. Sheet metal is used to make floors less slippery and more resistant to wear than floors made from plastic.

For reasons of economy, sheet metal plates for floors are rolled aluminum alloy sheets, the final pass having been performed using an engraved cylinder which bears the negative imprint of the pattern(s) to be made. By their method of forming, these plates generally have reliefs with substantially flat top walls, parallel to the faces of the sheets, connected to the plane of the sheet by oblique, slightly sloping walls.

BACKGROUND OF RELATED ART

Many models of plates with repetitive relief patterns already exist on the market. These patterns are described for example in the NF-EN-1386 standard and are often referred to figuratively (checkerboard, barley grain, almond, diamond, rice grain checkerboard 2, checkerboard 5, etc.). The "Checkerboard 5" pattern, also called "quintet", frequently used to make sheets for industrial floors, has a group of five bumps, of elongated semi-ovoid shape and parallel to each other, which is surrounded by four groups identical to each other and derived from the first group by rotating through 90°. Sheets that have this "quintet" pattern are highly resistant to wear but have only average anti-slip qualities. The "rice grain" pattern, described in patent FR 2 747 948, is also used for making aluminum alloy sheets for industrial floors, which have satisfactory properties in use, especially because they are hard-wearing and provide friction contact conditions that allow pedestrians to walk safely without slipping and falling, and trucks to run without skidding.

Recently, it has also been sought to reduce the noise generated by wheeled vehicles, such as trucks, which are to run on floors equipped with such sheets, especially the floors of refrigerated trucks. In fact, due to traffic congestion (an especially serious problem in Holland), deliveries to food stores are increasingly made at night, as a single truck can deliver to a greater number of stores. Recently, the government of the Netherlands issued a decree in order to limit noise during loading and unloading at night (specifically between 11:00 p.m. and 7:00 a.m.). In order to precisely define the sound level that is not to be exceeded and encourage a maximum number of carriers to comply as quickly as possible with the requirements of this Decree, an action program extending over several years, called "PIEK programme" was implemented. The Dutch word "piek" means "peak" and indicates that it is the peak level of noise that is targeted and not the level of continuous noise. As part of this program, the independent research organization TNO has developed a protocol for measuring noise in different configurations. This protocol was the subject of report DGT-RPT-020131, which was issued on 11 Nov. 2002 by this organization. If this protocol is followed (at least the part about running on truck floors, which is in Chapter 6 of this report), a truck for which, during loading and unloading, the sound pressure level at 7.5 meters from the vehicle remains below 60 dB(A) is considered as meeting the requirements of the Decree. The dB(A) is a weighted decibel which is a unit of sound pressure level and is used to measure environmental noise. As the human ear and brain interpret sound intensity in part based on its pitch, the intensity of a recorded sound is modified based on a weighting curve (A) that has been set so as to correspond closely to the perception of the human ear.

While the Netherlands are very advanced on the subject, the same trend to regulate night-time sounds emitted when loading and unloading trucks can be observed in all adjacent countries. Paris and other European cities are also therefore considering imposing a limit on the noise caused by unloading at night. Some supermarkets also want to reduce the noise made during loading and unloading. Most refer to the measurement protocol proposed by TNO, to the point of calling it the "PIEK standard" which, if observed, gives a kind of silence quality label (the "Piek Certificaat").

In practice, the sheet disclosed in FR 2 747 948, which has a set of patterns in relief in the shape of a grain of rice, is less noisy than some competing sheets also used for making floors of refrigerated trucks, especially the "quintet" sheets mentioned above, which are very noisy.

However, the "rice grain" pattern sheet in FR 2747948 still does not seem entirely satisfactory since the noise level reached is too high because of the new requirements, as the threshold not to be exceeded will soon be lowered.

Figure 3:
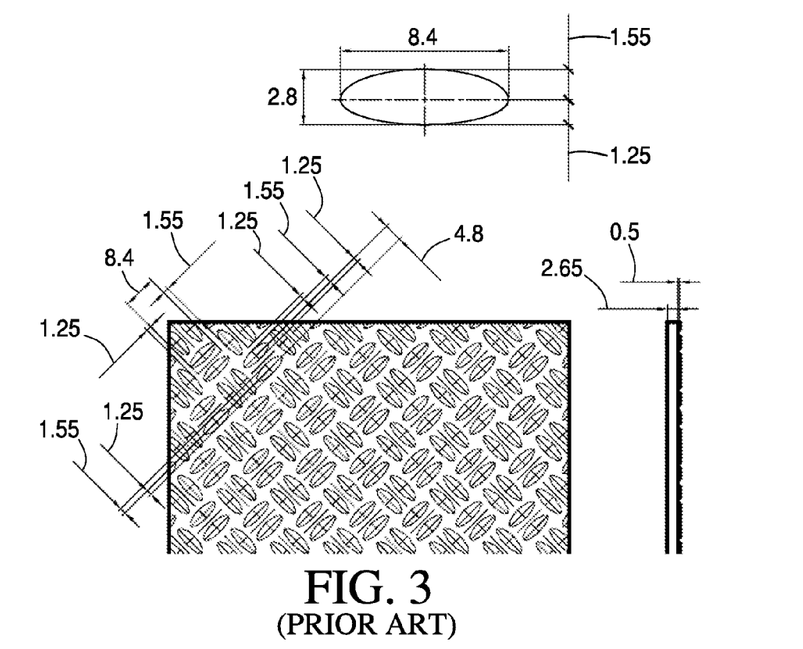
FIG. 3 shows a top view of a sheet from prior art with patterns in the form of rice grains.

The applicant has therefore tried to find a satisfactory solution to provide a sheet having one or more patterns in relief, designed to make industrial flooring, which not only provides good resistance to wear and satisfactory friction conditions for pedestrians to walk without risk of slipping and falling and for trucks to run without skidding, but also allows wheeled vehicles such as trucks to operate while generating significantly less noise than that emitted by said "rice grain" sheet, of which the pattern detail is shown in FIG. 3.

A first subject according to the invention is a sheet metal plate for making floors, in particular floors for industrial vehicles, on which trucks are to run, said sheet having on its upper surface a plurality of patterns, each pattern comprising one or more protrusions, called "reliefs", said patterns being arranged periodically, discreetly and in orderly fashion, said sheet being characterized in that:
  a) the maximum height of said reliefs is between 0.2 and 1.5 mm;
  b) said reliefs have a "friction" surface, which is defined by the intersection of a relief with a plane parallel to the surface of the sheet and located midway between the top of said relief and which, regardless of the direction in which it is measured, has a mean width of at least 0.7 mm, preferably greater than 1.0 mm, and preferably still, greater than 2 mm;
  characterized in that said reliefs are arranged in a plurality of aligned groups, i.e., a plurality of groups of reliefs in which the reliefs of each of said aligned groups have the same shape, the same direction and have their centers of gravity substantially aligned in the same direction (D), the minimum distance measured along said direction (D) between two adjacent reliefs of the same aligned group is always less than 6 mm, and preferably 5 mm.

The sheet according to the invention is a sheet metal plate designed to be placed on the floor of a vehicle. According to the current definition, a sheet is a rolled product of generally rectangular cross section whose average thickness does not exceed 1/10th of its width. The term "sheet metal with reliefs" as used herein covers both "engraved" and "relief" sheets as defined in standard EN12258. The term "engraved sheet" is a general term by which patterns can be printed or embossed on one or both sides, implying printing, engraving, embossing, or even machining such patterns onto a sheet with a perfectly rectangular cross-section, or rolling with a final pass on an engraved cylinder, the method associated with the term "relief sheet", which refers to a sheet "printed with a pattern in relief on one side, by rolling".

The sheet according to the present invention has patterns on one of its sides which include one or more reliefs and which, just like the unit cell of a crystal lattice, are repeated periodically and in orderly fashion. A pattern is therefore a piece of sheet metal which is repeated endlessly by translation in two directions of the plane of the sheet. This piece of sheet metal may comprise only one relief but it may also include several reliefs that may have different orientations or shapes. It does not seem advantageous to have reliefs of different heights, but this is not to be ruled out. To be acceptably hard-wearing under practical conditions of use, the maximum height of these reliefs is between 0.2 and 1.5 mm. Advantageously, in particular as regards aluminum alloy sheets with reliefs, it is between 0.2 and 1.0 mm, preferably between 0.3 and 0.8 mm, and preferably still between 0.4 and 0.6 mm.

Such patterns are repeated discretely, as such a configuration is favorable to the non-slip property of the floor. The reliefs behave like indenters which act on the surface of a sole or the tread of a wheel: the weight of the pedestrian or truck causes the surface to deform and "sinks" around the relief over a certain height of which the order of magnitude is one, two or three tenths of a millimeter. Discontinuous relief encourages, in the sole or the tread, the formation of a bead around its top wall, which helps the sole, the tread of the tire or the wheel on the floor to "stick". Additionally, patterns that repeat themselves discretely make floor cleaning easier, as fluids run off easily and they are easier to remove. The sheet according to the invention should therefore not have continuous relief.

Figure 1A:
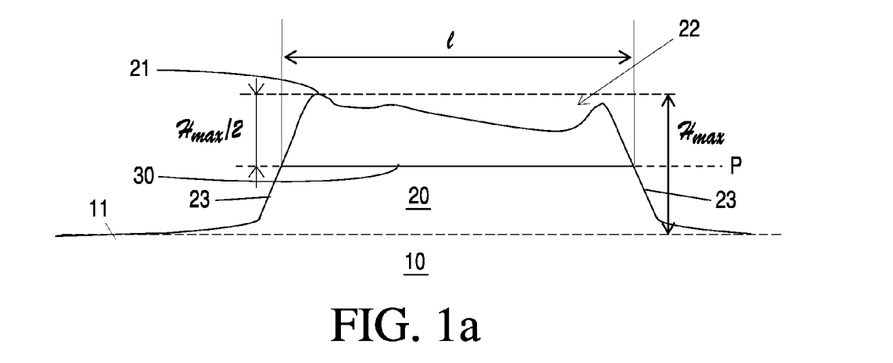
FIG. 1a schematically illustrates the cross-sectional and front view detail of a sheet with relief. It was used to define the friction surface.

As it is difficult to define the actual area of contact between these reliefs and the soles of walking pedestrians and/or tires or tracks of truck wheels that run on such floors, we will conventionally define an area correlated with the anti-slip properties of the relief of the sheet, which we will call the "friction surface". Said surface results from the intersection of said relief with a plane parallel to the face of the sheet, located at mid-height, i.e. halfway from the top of the relief. This definition is related to the phenomenon described above: the relief behaves like an indenter which acts on the surface of the sole or the tread of the wheel: FIG. 1a illustrates how said friction surface is obtained: face (11) of sheet (10) has a projecting relief (20) whose top surface (22) is not necessarily planar and parallel to face (11) of the sheet. The friction surface (30) is defined as the intersection of the relief (20) with a plane (P) parallel to face (11) of the sheet and distant by $H_{max}/2$ from the top (21) of the relief (20), the maximum height $H_{max}$ being the distance between said top and face (11) of the sheet. The walls (23) of the relief are not very steep: they typically make an angle of less than 45° with the face (11) of the sheet.

Figure 1B:
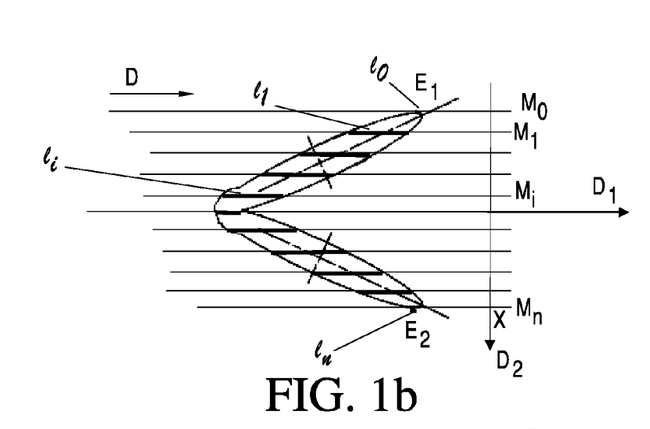

In FIG. 1a, the friction surface extends over a width l. The applicant noted that it was necessary for this width l to be on average large enough for the contact to result in an effective frictional force: if l is too low, the material of the sole or the tread moves to one side or the other of the relief, without being particularly held back. This is why the applicant defined a criterion stating that, regardless of the direction of scanning, the average width of the relief should be at least 0.7 mm. FIG. 1b illustrates the principle for calculating a mean width measured in a given direction ($D_1$): along direction (D2) perpendicular to direction (D1), we define the ends E1 and E2 of the relief, whose coordinates are 0 and X respectively on axis (D2) and plot n times between said ends a line $M_i$ (i=1 to n) parallel to direction (D1), which intersects the friction surface over a length $l_i$. The average width of the relief relative to direction (D1) is given by:

$$\bar{l} = \lim_{n \to \infty} \frac{\sum_0^n l_i}{n}.$$

It can obviously be approximated by a mean made over N measurements $$\left( \frac{\sum_0^N l_i}{N} \right),$$

N being a greater or smaller integer depending on the complexity of the shape of the friction surface. Preferably, to improve the anti-slip property of the sheet, the average width of the friction surface in direction (D) is greater than 1.0 mm, or even greater than 2 mm.

Figure 1C:
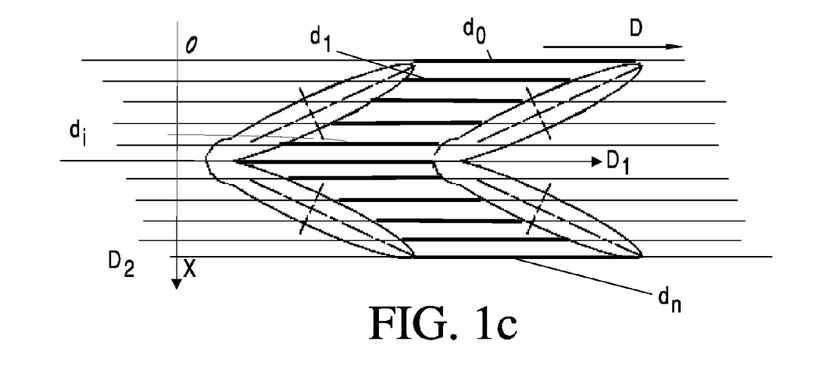
FIG. 1c shows a schematic top view of two adjacent reliefs of an aligned group as defined above having the same shape, the same orientation and aligned in direction D1. It was used to define the minimum distance in direction (D1).

The applicant tested many sheets with reliefs with different morphologies and distributions. He observed when performing a vibration measure test described below, that the best results were obtained on sheets which had reliefs arranged in a plurality of aligned groups, i.e., a plurality of groups of reliefs in which each relief has the same shape, the same orientation and a center of gravity which lies substantially along a line parallel to a given direction (D), the minimum distance measured along said direction (D) between two adjacent reliefs of the same aligned group being always less than 6 mm, and preferably 5 mm. To characterize the shape, orientation and center of gravity of a relief, as well as the minimum distance between two reliefs, one can refer again to the friction surface as defined above and illustrated in FIG. 1a. FIG. 1c shows two adjacent aligned reliefs of the same shape and same orientation, whose centers of gravity are aligned in direction D1. It illustrates the principle for calculating a minimum distance measured in a given direction (D1): along direction (D2) perpendicular to direction (D1), we define ends E1 and E2 of the relief, whose coordinates are 0 and X respectively on axis (D2) and we draw n times between said ends a line $M_{ii}$ (i=1, n) parallel to direction (D1). Line $M_i$ passes through the friction surfaces of the reliefs, creating gaps of length di between two friction surfaces. The minimum distance between adjacent reliefs is given by: $\lim_{n \to \infty} \text{Min}(d_i, i=1, n)$ This value can obviously be approximated by a calculation made over N measurements (Min(di, i=1, N), N being a greater or smaller integer depending on the complexity of the shape of the friction surface in relation to the aligned group. It is said that this minimum distance must always be less than 6 mm, in the sense that such reliefs of the same aligned group can be distributed non-uniformly and that the minimum distance in direction (D) between two adjacent reliefs, though it may vary depending on the reliefs chosen, must never exceed 6 mm. The patterns are preferably aligned on the same line in direction (D). Obviously, the concept of aligned group also includes configurations of reliefs of the same shape, the same orientation and whose centers of gravity are substantially aligned, i.e., very close to the same line in direction (D), typically spaced apart by at most 1 mm from such a line.

Advantageously, the given alignment direction (D) of the reliefs of the aligned groups is substantially parallel to the general direction (Dc) of movement of the trucks over said sheets. The applicant found that the quietest sheets were those with groups aligned in a direction close to the overall direction of movement of trucks, with reliefs of the same shape, and orientation and close to each other, with a minimum distance measured along the overall direction of movement of the trucks of less than 6 mm, and preferably less than 5 mm.

The applicant also concluded that "nesting" reliefs of different shapes in one alignment could certainly have an aesthetic effect but seemed disadvantageous regarding the noise generated by a wheel moving on such sheets. It therefore seems advantageous to have only one relief shape, only one relief orientation per aligned group, two adjacent reliefs being not too far from each other, the typical maximum distance given by the minimum distance along (D) between the top friction surfaces of two adjacent aligned reliefs which must be less than 6 mm, and preferably 5 mm. This does not preclude the possibility of having two aligned groups of reliefs of different shape and/or different orientation adjacent each other, provided that the lines joining their respective centers of gravity are not too close to one another, i.e., are typically spaced by at least one millimeter from each other.

Advantageously, the sheet has over 3000 reliefs per square meter. Below this number, depending on the morphology of the patterns, the sheet loses its anti-slip properties and/or its ability to dispel fluids. In addition, said evenly distributed reliefs must have a total surface area over which friction can effectively provide an anti-slip effect. By defining the surface fraction as the ratio of the sum of the top friction surfaces of the reliefs of a pattern to the surface of the pattern (the pattern being defined herein as a unit cell of the network), the sheet preferably has reliefs which occupy a surface area fraction of at least 5%, and preferably greater than 30%. Preferably, the number of reliefs per square meter is less than 30,000, so that said reliefs have a sufficient contact area, the friction surface having a surface area typically greater than 3 mm$^2$ Advantageously, the sheet has at least one plurality of aligned groups whose reliefs have a larger dimension slightly tilted in relation to direction (D), typically making a constant angle smaller than 30° with said direction (D). If the angle is different from 0°, and typically greater than 2° it is possible, by shifting the respective centers of gravity in direction (D), to place two aligned groups with identical reliefs very close to each other and thereby have a greater surface density of reliefs. If the angle is close to 0, and typically less than 2°, the reliefs have a greater dimension orientated in direction (D) and this is preferably greater than 16 mm.

A second embodiment of relief sheets according to the invention is a sheet which comprises at least one first plurality of aligned groups whose reliefs have a larger dimension tilted at an angle $\alpha$ relative to direction (D) and a second plurality of aligned groups whose reliefs have a larger dimension tilted at an angle -$\alpha$ relative to direction (D). In a preferred variant, said first plurality of aligned groups and said second plurality of aligned groups are arranged such that two adjacent aligned groups, each belonging to a different plurality of aligned groups, are symmetrical to each other around an axis in direction (D).

Preferably, the relief plates according to the invention are rolled aluminum alloy sheets which have on one of their faces a plurality of "reliefs", arranged periodically, discretely and in orderly fashion, said reliefs being in the form of elongated bumps like semi-ovoids. Although in order to characterize their geometry, we refer below to concepts such as the minor axis and the major axis of an ellipse, these semi-ovoids are not strictly speaking semi-ellipsoids since the junction with the plane of the sheet is tangential to said plane. Advantageously, on such rolled sheets, the elongated reliefs in the form of a semi-ovoid have a typical shape, wherein the ratio of the major axis to the minor axis is between 2 and 15, and preferably between 5 and 10. It is advantageous to select rolled plates for which the overall direction (D) of movement corresponds to the direction of rolling (L), the sheet having a width at least equal to that of the vehicle floor and having the desired rolled length to make up said floor in one piece. The maximum height of the reliefs is between 0.2 mm and 1.0 mm, and preferably between 0.3 mm and 0.8 mm, and even more preferably between 0.4 mm and 0.6 mm. Advantageously, the sheet is made of an alloy belonging to the group comprising aluminum alloys of series 5xxx, 6xxx as designated by the Aluminum Association and 7xxx series alloys comprising less than 0.4% Cu.

In one embodiment, the rolled aluminum alloy sheet has at least one plurality of aligned groups of semi-ovoids slightly tilted with respect to the direction of rolling, typically making a constant angle of less than 30° with said direction of rolling. If the angle is substantially different from 0°, and typically greater than 2, it is possible to put two aligned groups of identical reliefs or two groups of reliefs oriented symmetrically with respect to the direction of rolling side by side, and then, by shifting the respective centers of gravity in the direction of rolling, to adjust the distance between aligned groups so as to obtain a surface density of reliefs greater than that which could have been obtained with reliefs simply aligned along the direction of rolling. We have already seen that adjacent reliefs of the same aligned group should be separated by less than 6 mm, and preferably less than 5 mm, along the overall direction, i.e. along the direction of rolling. If the angle is close to 0°, and typically less than 2°, the semi-ovoids have their major axis oriented along the direction of rolling, said major axis is preferably greater than 16 mm and adjacent reliefs in the same aligned group are separated by less than 6 mm, and preferably less than 5 mm, in the direction of rolling. Moreover, as regards rolled sheets, the distance between the reliefs is preferably greater than about 2 mm for the reliefs to be properly formed during the final rolling run.

In one embodiment, the sheet contains only aligned groups of semi-ovoids oriented in the direction of rolling, two adjacent semi-ovoids being spaced from each other by a distance of between 2 and 6 mm in the direction of rolling. Typically, the distance between the axes of the aligned groups is at least equal to the minor axis of the friction surface (treated as an ellipse) of the relief plus 2 mm. Preferably it is between 3 mm and 15 mm. Advantageously, the aligned groups are offset relative to each other such that the centers of gravity of the reliefs describe, in the crosswise direction, a broken line, the offset $\Delta$ along the direction of rolling (L) between the peaks of the broken line remaining less than or equal to the major axis of the semi-ovoid. The network of reliefs on the sheet can also be described by a unit cell in the shape of a chevron, of which the axis of symmetry is parallel to the direction of rolling (L) and which comprises 2n reliefs in the form of semi-ovoids, n being an integer greater than 1, and typically close to 3, and arranged as follows: one relief on the axis of symmetry, (n−1) reliefs regularly distributed on both sides of the axis of symmetry and a half-relief at each end, the offset in the direction of rolling (L) between the centers of gravity of two adjacent reliefs being equal to Δ/n.

In another embodiment, the sheet includes aligned groups of said reliefs in the form of semi-ovoids tilted at an angle α in the direction of rolling (L) and aligned groups with reliefs of the same semi-ovoid shape tilted at an angle-α relative to the direction of rolling (L).

In another embodiment, the sheet comprises a first plurality of aligned groups of reliefs having a first semi-ovoid shape elongated in direction (L), a second plurality of aligned groups of reliefs having a second semi-ovoid shape and tilted at an angle α relative to the direction of rolling (L) and a third plurality of aligned groups of reliefs of the same second semi-ovoid shape tilted at an angle-α relative to the direction of rolling (L), said pluralities of aligned groups being arranged such that three adjacent aligned groups belong respectively to the second, the first and third plurality of aligned groups, the second and the third being symmetrical to each other around an axis of direction (D), the first being located on said axis of symmetry.

In another embodiment, the sheet has on one side a plurality of "reliefs", arranged periodically, discretely and in orderly fashion, said reliefs having the overall shape of a chevron, typically composed of two slender V wings (similarly slender to the semi-ovoids, i.e. between 2 and 15) joined by a substantially circular apex whose diameter is close to the average thickness of said wings. It can be either a chevron whose axis of symmetry is parallel to the direction of rolling (L), the angle between the two wings of the chevron being preferably less than 60°, or a chevron whose axis of symmetry is perpendicular to the direction of rolling (L), the angle between the two wings of the chevron being preferably greater than 120°. In either of these geometric configurations, the wings are slightly tilted with respect to direction (D). Advantageously, said chevron-shaped reliefs are arranged in aligned groups of reliefs of the same shape and the same orientation, the minimum distance between two adjacent reliefs of the same group, measured in said direction of rolling, being less than 6 mm.

Advantageously, the sheet has alternating aligned groups of chevrons pointing in different directions. For example, for chevrons with a symmetry axis parallel to the direction of rolling (L), the angle between the two wings of the chevron being preferably less than 60°, one alternates between aligned groups of chevrons facing forwards with aligned groups of chevrons facing backwards, as shown in example 2. It is also possible, for chevrons having an axis of symmetry perpendicular to the direction of rolling (L), the angle between the two wings of the chevron being preferably greater than 120°, to have aligned groups of chevrons facing towards the left alternating with aligned groups of chevrons facing towards the right, as shown in example 5. The last example shows that said chevrons, if their centers of gravity are shifted by half a length, can advantageously be nested into each other.

A possible generalization, including elongated semi-ovoids slightly tilted with respect to (L) and chevrons having an axis of symmetry perpendicular to the direction of rolling (L) described above can be produced by describing a relief grouping n semi-ovoids of slenderness typically between 2 and 15, joined by (n−1) common vertices, where n is an integer typically between 1 and 10, alternately tilted by an angle α and an angle −α relative to the direction of rolling, α being preferably less than 30°.

Advantageously, the sheets have reliefs whose morphology, number and arrangement are such that by applying to said sheet a particular test for measuring vibration described in detail below, the A-weighted vibration velocity ($Lv_A$) in the frequency range 20 Hz-5 kHz is less than −67.5 dB (A), if a thermoplastic wheel with a rubber tire of Shore A hardness of typically between 70 and 80, with a width typically ranging between 25 mm and 35 mm, a diameter of 10 cm and with a tire that typically gives a substantially cylindrical contact surface of radius 5 cm over at least 2 mm is made to run on said sheet, said wheel rotating with a speed of about 1 m/s in a general direction (Dc) of movement. Sheets are preferably chosen such that said A-weighted vibration velocity is less than −68.0 dB (A), and preferably still less than −69.0 dB (A).

Said vibration measure test is performed in the following experimental conditions:
i) a specimen sheet is taken, of length at least 30 cm in said general direction (Dc) of movement;
ii) a test bench is used, comprising:
   ii1) an instrumented truck, made up of a board with three wheels: a rear wheel, located in the middle, near the rear edge of the board, and two front wheels, preferably identical to the rear wheel, in the vicinity of the front edge of the board, and near each side edge, said instrumented truck being loaded with 12.5 kg per wheel and comprising an accelerometer mounted on the rear wheel axle bearing;
   ii2) a sample-holder designed to receive said sample sheet and hold it firmly, while surrounding a track at least 30 cm long which presents its upper face provided with reliefs for said rear wheel to run on;
   ii3) two smooth lateral tracks surrounding said sample-holder which are designed for the front wheels at the same height as the rear wheel;
iii) the truck is set in motion in such a way that, when the rear wheel arrives onto said strip of sheet metal, the truck is moving at a speed close to 1 m/s,
iv) throughout the time that the rear wheel is on said track, the acceleration measured by said accelerometer is recorded as a time signal, a frequency analysis of said time signal is made, and the A-weighted vibration velocity (LvA) in the frequency range 20 Hz-5 kHz is calculated.

Said A-weighted vibration velocity in a frequency range [f1, f2] is given by the formula:

$$Lv_A = 10 \log_{10}\left[\int_{f_1}^{f_2} \frac{V(f)^2}{V_0^2} pond_A(f)^2 df\right],$$

where:
  $V_0$ is a reference velocity, in this case 1 m/s,
  V (f) is the spectrum of the vibration velocity obtained from the recording of the time signal of the acceleration and
  $pond_A(f)$ is the frequency weighting curve A defined in standard EN61672-1

To characterize the performance of the sheets, the applicant conducted noise tests using a protocol close to the protocol described in §6 of the report DGT-RPT-020131 by TNO. In a refrigerated trailer, several types of trucks were used to help quantify the noise levels generated by said trucks running on the trailer floor with reliefs. This floor was made of sheet aluminum with reliefs in the shape of rice grains. Analysis of acoustic radiation in the trailer showed that the A-weighted overall sound level is mainly due to three factors:
  the natural vibration of the truck when it is in motion;
  the vibration of the floor due to the wheels running on the reliefs;

the vibration of the truck caused by the wheels running on the reliefs;

The applicant found that if a truck is used similar to that shown in FIG. 6.2 in the report DGT-RPT-020131 by TNO, only the last two factors contribute to the noise.

The applicant was able to conclude from this analysis that sound emission related to trucks similar to the one shown in FIG. 6.2 of the report DGT-RPT-020131 by TNO running on a floor with reliefs depended, surprisingly, almost entirely on the effect of vibrations induced by the rotation of the wheels on the reliefs, and it is therefore sufficient to measure the accelerations caused on the wheel axles of trucks to characterize the low noise quality of a floor. In practice, accelerations can be measured on the floor of the truck adjacent to a wheel axle bearing.

The applicant attempted to define this ability to emit low intensity audio signals by general, purely geometric criteria but his attempts were unsuccessful because purely geometric criteria lead to a restrictive definition of the invention. This ability to emit low intensity audio signals cannot be summarized, for example, as a minimum distance between reliefs that would prevent the wheel from at any time touching the surface of the sheet between two reliefs: firstly, there is no reason to prevent the truck from running directly on the surface of the sheet, and secondly, given the usual geometries of the truck wheels, it would impose very low distances between reliefs, so low that these sheets could not be obtained by rolling. In addition, the kinetics of the wheel, and the direction and magnitude of its velocity when it comes into contact with a relief play a very important role that it is possible to take into account only on a case-by-case basis, depending on the shape and arrangement of the reliefs of the sheet in question.

However, bearing in mind the previous observation, to characterize the low noise or "silent" quality of a sheet with reliefs, the applicant developed a test for measuring vibration, which is performed on a sample sheet with small reliefs and is less expensive and quicker to implement than a set of acoustic measurements involving the movement of trucks on a refrigerated truck floor, such as the sound measurement test imposed by the TNO protocol. The characteristic value of the "silent" quality of sheets when being run over by trucks is the A-weighted vibration velocity in the frequency range 20 Hz-5 kHz resulting from measuring accelerations recorded on the axle bearings of a truck wheel moving in a general direction (Dc) on said sheet, measured for a certain period of time, typically 250 ms, which corresponds to the wheel moving over a length corresponding to at least five patterns, preferably at least ten patterns, typically in the order of 25 cm. In practice, the accelerometer can be placed on the wheel bearing, or in close proximity to it, in a place that is easily accessible and where the accelerometer is easier to fix. It should be noted that the vibration measure test developed in the context of the present invention provides a value that depends on both the direction of movement (Dc) chosen and secondly on the nature of the truck wheel used, particularly the geometry of the contact surface between the wheel and the floor, the nature of the materials forming said wheel, and its conditions of loading. It is obvious that the sheets can be compared only if the test was performed with the same type of wheel.

Performing this test on the sheet with the "rice grain" pattern as described in FR 2 747 948 and illustrated in FIG. 3, and using a truck similar to that in the TNO protocol and provided with "semi-rigid" wheels made of thermoplastic and with elastic gray rubber tires, with Shore A hardness of typically between 70 and 80, width typically between 25 mm and 35 mm, diameter 100 mm and whose tires provides a substantially cylindrical contact surface of radius of 5 cm over at least 2 mm, and by having the truck run in direction (Dc) corresponding to the direction of rolling of the sheet, there is an A-weighted vibration velocity of −63.5 dB (A). It is said that it offers a substantially cylindrical contact surface of radius 5 cm over at least 2 mm, in the sense that, in a stress-free state and at the level of the contact, the edge of the wheel tire has, on either side of the median plane of the wheel, perpendicular to the axis of said wheel, a radius of curvature of 5 cm in any cutting plane parallel to the median plane and spaced therefrom by a value at least equal to 1 mm and a very large radius of curvature, typically greater than 1 m, in a plane perpendicular to said cutting plane.

Performing this test with the same wheel running on sheets with reliefs such as those shown in Examples 1 to 3 below, we find that they give better performance, characterized by A-weighted vibration velocity values of less than −67.5 dB (A). Acoustic studies on truck floors fitted with these plates have confirmed that, as they give better results than those obtained with the "rice grain" sheet in FIG. 3, they perfectly meet the criteria of the "PIEK standard".

The exact experimental conditions of the vibration measure test are as follows:

a) the sample from which the measurements are made is a piece of sheet with reliefs measuring 200*300 mm; the largest dimension corresponds to the direction of movement (Dc).

b) a test bench is used, comprising:
  b1) an instrumented truck made of a piece of chipboard of dimensions 480*440*19 mm, provided with three wheels: a rear wheel in the middle, close to (typically 5 cm away) the rear edge of the board, and two front wheels located laterally, in the vicinity (typically 45 mm from the corresponding side edge and 5 cm from the front edge of the board). The instrumented truck is loaded with 12.5 kilograms per wheel. This gives loading conditions close to the TNO protocol truck which is illustrated in FIG. 6.2 of the report DGT-RPT-020131: it has 4 wheels and in addition to its own weight it is loaded with a sand bag weighing 25 kg is distributed over the entire surface of the truck. The instrumented truck is provided with an accelerometer mounted on the board of said truck, at the foot of the rear wheel axle bearing, typically on the upper face of the board in line with the wheel bearing. All three wheels are the same size and, preferably, of the same kind even though only the rear wheel is instrumented and runs on the sheet. To characterize the low-noise property of the sheet, we chose the wheels that proved to be the least noisy in our tests, in order to make our tests more discriminating: these are "semi-rigid" thermoplastic wheels with rubber tires of Shore A hardness typically between 70 and 80, width typically between 25 mm and 35 mm, diameter 100 mm and whose tire gives substantially cylindrical contact surface of radius 5 cm over at least 2 mm.
  b2) a sample-holder, comprising a flat support designed to receive said piece of sheet metal and two side clamps designed to grip the sides of said piece of sheet metal, the overlap being such that, combined with the clamping forces exerted by said clamps, they hold the sides of the sample by flush fitting, said clamps being arranged so that they surround a portion of the sample which remains uncovered and which is a track 300 mm long, and about 70 mm wide, presenting its upper face provided with reliefs for said rear wheel to run on;

b3) two smooth lateral tracks surrounding said sample-holder which are designed for the front wheels at the same height as the rear wheel;

c) the truck is set in motion in such a way that, when the rear wheel reaches said track, the truck is running at a speed close to 1 m/s, typically between 0.9 and 1.1 m/s. The truck can be set in motion, for example, by means of a launch ramp and a device pulling the truck in a substantially horizontal direction.

c) throughout the time that the rear wheel is on said track, the acceleration measured by said accelerometer is recorded as a time signal and a frequency analysis of said time signal is carried out in the range 20 Hz-5 kHz, typically with an increment of 8 Hz, of said time signal, and the A-weighted vibration velocity in said frequency range is calculated. The A-weighted vibration velocity ($Lv_A$) is given by the formula:

$$Lv_A = 10\log_{10}\left[\int_{20Hz}^{5kHz} \frac{V(f)^2}{V_0^2} pond_A(f)^2 df\right]$$

where $V_0$ is the reference speed of 1 m/s, V(f) is the spectrum of the vibration velocity obtained from the recording of the acceleration time signal and $pond_A(f)$ is the frequency weighting A defined in standard EN61672-1.

If the wheel used for the vibration measure test is a thermoplastic wheel with rubber tread of Shore A hardness typically between 70 and 80, width typically between 25 mm and 35 mm, diameter 100 mm and whose tread provides a substantially cylindrical contact surface of radius 5 cm over at least 2 mm, and if the A-weighted vibration velocity is less than −67.5 dB (A), the sheet being tested is considered to have good anti-noise properties, much better than those of the "rice grain" sheet shown in FIG. 3, and it is known fairly quickly that this plate is likely to successfully meet with the low-noise criteria of the "PIEK certificate". The test is preferably carried out with such a "semi-rigid" wheel because it seems to be more discriminating than if performed with a harder wheel, for example a solid polypropylene wheel, which is generally noisier and whose use will ultimately become less frequent because of the more and more severe silence criteria that may soon be applied in some countries.

In the application concerned, there is a general direction (Dc) along which the movement of trucks is more frequent and in which they reach higher speeds. The applicant concluded from this it was not necessary to require the same level of "silence" quality in other directions, and a sheet with reliefs designed to the silence criteria of the TNO protocol could have better directional properties in the general direction of movement (Dc) than in the other directions, especially in the direction perpendicular to (Dc). So for the sheets in the examples presented below, that meet the "Piek Certificaat" criteria, the A-weighted vibration velocity is less than −62 dB for "semi-rigid" wheels running in the direction perpendicular to (Dc).

The vibration measure test can also be performed using harder wheels, for example with solid polypropylene wheels, of diameter 100 mm, load capacity 125 kg, and width 35 mm, with a tread having a spherical contact surface of radius 5 cm, and with a hub of the "full body" type. It is said that it has a spherical contact surface in the sense that at the level of contact and in a stress-free state, the edge of the wheel has a radius of curvature in a plane passing through the axis of the wheel and in the plane perpendicular to said axis, which are both equal to 5 cm. For sheets in the examples presented below, the A-weighted vibration velocity is less than −49 dB(A) if such wheels are made to run in direction (Dc).

The applicant also performed vibration measure tests with hard wheels because these are the wheels used in the TMO protocol. After many measurements made on the two types of wheels, it was found that while the vibration velocity level was different depending on the wheel used, the hierarchy of plates tested was generally not changed with regard to their anti-noise property. Obviously, whatever the wheel used, it must not be too worn, i.e. it must have a circular tire, free from flat areas or other geometric imperfections that may generate vibrations in the wheel as it rotates.

Preferably, the sheets have aligned groups arranged such that the minimum distance, in the direction perpendicular to the given direction (D) between two adjacent reliefs of two different aligned groups is less than 15 mm, typically between 2 mm and 15 mm.

Another subject of the invention is the use of a sheet as described above to make floors on which trucks are to run in a general direction (Dc) of movement, characterized in that the aligned groups have reliefs whose centers of gravity are substantially aligned along a given direction (D) substantially parallel to said general direction (Dc) of movement. The floors concerned are typically vehicle floors and, as they are rectangular in shape, there is a general direction (Dc) along which movement of trucks is more frequent and where they reach higher speeds. If the sheet is a rolled "relief sheet", the direction of rolling (L) coincides advantageously with said general direction (Dc) of movement.

More specifically, another subject of the invention concerns the use of a rolled relief sheet made of aluminum alloy as described above for making floors of refrigerated vehicles, characterized in that said aligned groups of reliefs are aligned in the direction of rolling (L) and in that said relief sheet is placed on the floor of the vehicle in such a way that the direction of rolling coincides with the length of the vehicle. It is in the direction of the length of the vehicle that trucks run most frequently and can reach the highest speed.

Another subject of the invention is the engraved cylinder used at the end of the rolling run to make the sheet according to the invention, the cavities engraved on the cylinder having the appropriate geometric characteristics making it possible to obtain the aligned groups of reliefs described above. For the manufacturer, engraving the rolling cylinder represents a significant investment, especially if he wants to produce wide sheets or strips. He therefore hopes that the cylinder will last as long as possible. Also, to reduce cylinder wear, ensure that the sheet is properly flat and avoid cracks and surface defects apparent on the non-engraved parts of the sheet, it is necessary, when the sheet comes into contact with the cylinder, for the sheet metal to "rise" easily into the hollows of the cylinder engraving, which requires that the fraction of the engraved surface of the cylinder is sufficient and the relief not too thin. The dimensions of the reliefs as defined above make it possible to produce the cavities, typically by mechanical engraving, which means that hardened steel can be used and gives the cylinder an increased lifetime, and also enables the production of reliefs with neat contours. Moreover, it is possible to use wide cylinders to engrave sheets over 2 meters wide, or even over 2.5 m wide. Relief sheets obtained in this way have neat reliefs over a very flat non-engraved surface.

FIG. 1b schematically illustrates a top view of a relief. It was used to define the average width in a given direction (D1).

Figure 2A:
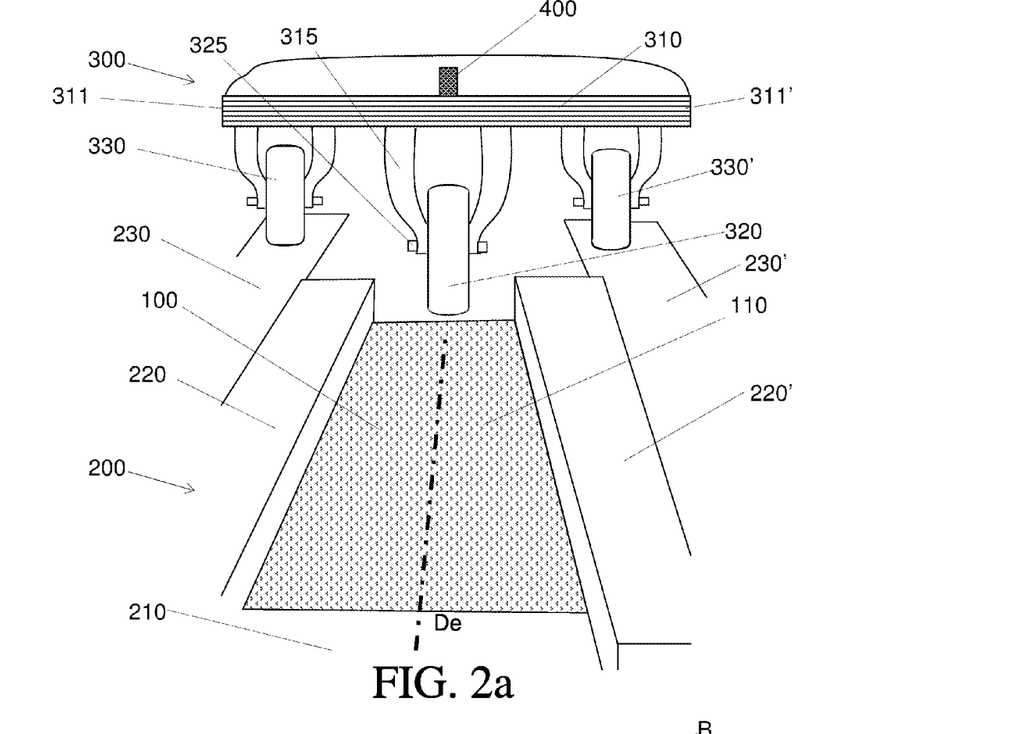
FIG. 2a schematically illustrates a part of the truck and the device used for the vibration measure test.
Figure 2B:
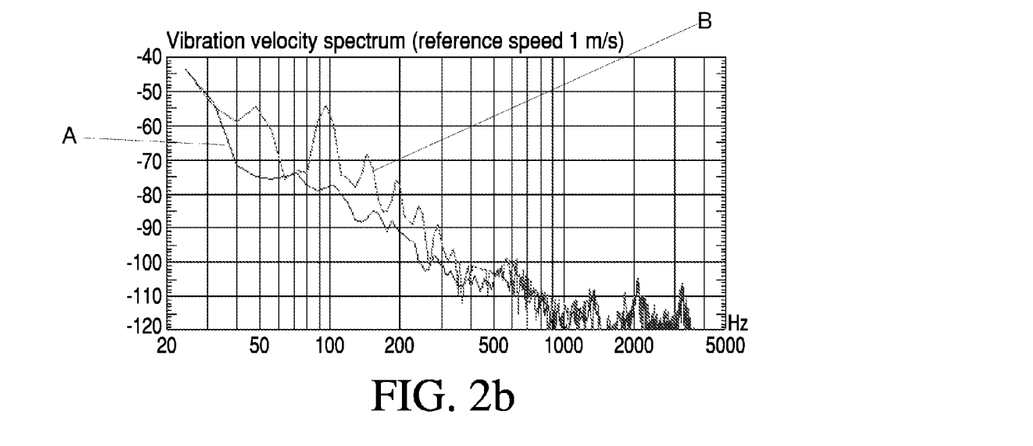
FIG. 2b schematically illustrates a vibration velocity spectrum obtained after frequency analysis of the time signal of the acceleration measured at the truck wheel axle.

MEASURING DEVICE (FIGS. 2a AND 2b)

FIG. 2a schematically illustrates, in perspective, the observer placed in the general direction (Dc) of movement and looking from the rear towards the truck (300) and the sample-holder (200), immediately after a vibration measure test.

The sample (100) from which the measurements are made is a piece of sheet with reliefs measuring 200*300 mm. The largest dimension corresponds to the direction of movement (Dc). The sample-holder (200) comprises a flat support (210) which is placed on the sample and two side clamps (220, 220') that clamp the sides of said piece of sheet metal and surround part of the sample that has remained uncovered which forms a track (110) approximately 70 mm wide and 300 mm long, offering its upper surface provided with reliefs for the instrumented rear wheel (320) to run on.

The truck (300) is an instrumented truck which comprises a piece of chipboard (310) size 480*440*19 mm, provided with three wheels: a rear wheel (320) located in the middle, 5 cm from the rear edge of the chipboard (not illustrated so as to show the rear wheel), and two front wheels (330, 330') located laterally at 45 mm from the side edge (311, 311') of the truck and 5 cm from the front edge of the board (not shown)). The instrumented truck is loaded with 12.5 kilograms per wheel (a sandbag is placed on the board of the truck). The instrumented truck is provided with an accelerometer (400) mounted on the board (310) of said truck, at the foot of the bearing (315) of the axle (325) of the rear wheel (320), here on the top side of the board (310), in line with the wheel bearing.

Wheels (310, 320, 320') are identical, preferably new or little used. Preferably, these are thermoplastic wheels with standard roller hubs and nylon rings (polyamide 6) surrounded by a gray rubber elastic tire of Shore A hardness typically between 70 and 80, width typically between 25 mm and 35 mm, diameter 100 mm, the tire providing, when unladen, a substantially cylindrical contact surface of radius 5 cm over at least 2 mm. More specifically, we used wheels provided by LAG under the reference 13058G for these vibration measure tests.

We also tested with "hard" wheels: These are solid wheels made of polypropylene, diameter 100 mm, load capacity 125 kg, width 35 mm, with a tread that has a transverse radius of curvature of 5 cm and a hub of the "full body" type. More specifically, for these vibration measure tests we used wheels supplied by Radiospares, referenced RS 387-919. They tend to be noisier than "semi-rigid" wheels.

Two smooth lateral tracks (230, 230') surround the sample-holder (200). They are designed for the front wheels (330, 330') to run on at the same height as the rear wheel (310). During the test, the truck is pulled in a substantially horizontal direction so that, when the rear wheel (310) reaches the track (110), the truck is moving at a speed close to 1 m/s, which remains close to this value throughout the test (i.e. about 250 ms).

Throughout the time that the rear wheel (310) is on the track (110), the acceleration measured by the accelerometer (400) is recorded as a time signal and a frequency analysis of the time signal is carried out in the range 20 Hz-5 kHz, and the A-weighted vibration velocity in said frequency range is calculated. FIG. 2b illustrates an example of a "vibration velocity spectrum" a curve deriving from the frequency analysis carried out using measurements of the time signal of the acceleration at the axle of the truck wheel, where the curves show the level of vibration velocity as function of frequency. Curves A and B result from a frequency analysis by 8 Hz increments and serve as a basis for calculating the A-weighted vibration velocity.

Curve A is typical of a thermoplastic wheel with a rubber tire running on a smooth sheet at a speed close to 1 m/s and the A-weighted vibration velocity calculated is −83.5 dB(A). Curve B is typical of the same wheel running at the same speed on a sheet provided with reliefs corresponding to the particular method of Example 1 shown in FIG. 5. The A-weighted vibration velocity calculated is −71.8 dB(A).

SPECIFIC EMBODIMENTS OF THE INVENTION

Example 1

Figure 4:
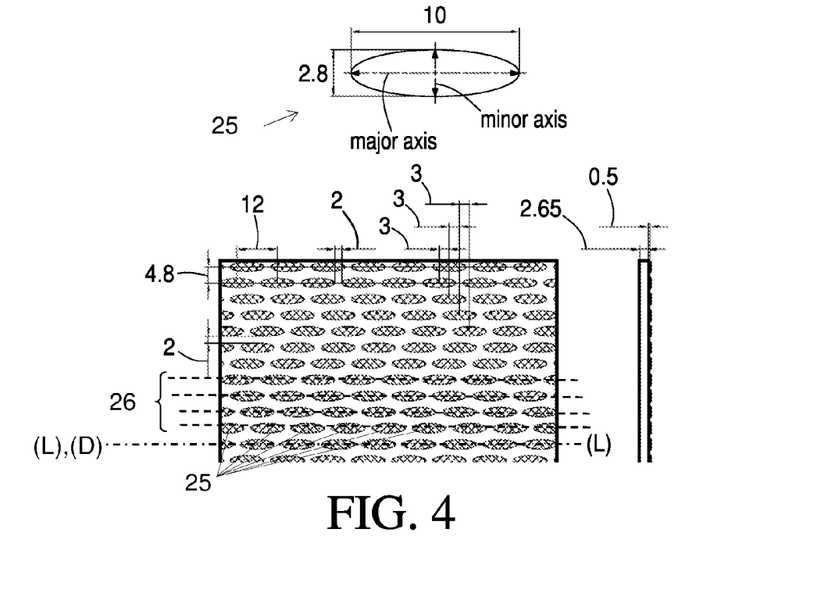
FIGS. 4 and 5 show a top view of two variants of an embodiment of the invention which is a rolled sheet having aligned groups of reliefs in the shaped of semi-ovoids elongated in the direction of rolling.
Figure 5:
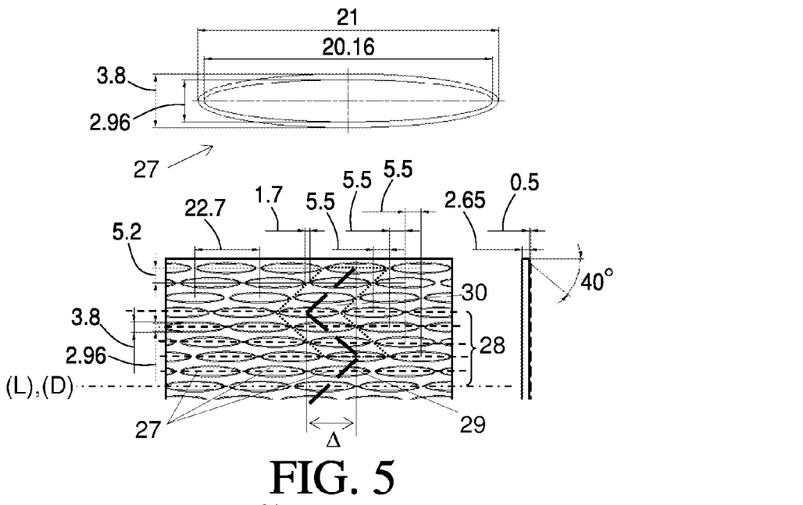

Sheet with Elongated Aligned Reliefs Along (L) (FIGS. 4 and 5)

The sheets in this example, two particular variants of which are shown in FIG. 4 and FIG. 5, include only one plurality of aligned groups ((26) for FIG. 4, (28 for FIG. 5) of reliefs in the form of semi-ovoids ((25) and (27)) oriented in the direction of rolling (L), two adjacent semi-ovoids being distant from each other by between 2 and 9 mm in the direction of rolling.

In FIG. 4, we show one example of a sheet with reliefs symbolized by their top friction surfaces. In FIG. 5, we have shown the sheet differently, the reliefs being symbolized by the two contours characteristic of the engravings to be made in the rolling cylinder, the inner contour corresponding to the bottom of the engraving and considered as being representative of the friction surface.

The aligned groups are distant (in the crosswise direction) by a value (4.8 mm in FIG. 4, 5.2 mm in FIG. 5) which is at least equal to the minor axis of the friction surface (treated as an ellipse) of the relief plus 2 mm (2.8+2 for FIG. 4; 2.96+2 for FIG. 5).

The aligned groups (26, 28) are offset from each other in such a way that the centers of gravity of the reliefs describe, in the crosswise direction, a broken line (29). The offset Δ along the direction of rolling (L) between the tops of the broken line, equal to 9 mm for FIG. 4 and 16.5 mm for FIG. 5, is less than or equal to the major axis of the semi-ovoid (10 for FIG. 4; 20.16 for FIG. 5). The network of reliefs on the sheet can also be described by the unit cell (30) in the shape of a chevron, of which the axis of symmetry is parallel to the direction of rolling (L) and which comprises 6 reliefs in the form of semi-ovoids, arranged as follows: one relief on the axis of symmetry of the chevron, 2 reliefs regularly distributed on both sides of the axis of symmetry and a half-relief at each end, the offset between the centers of gravity of two adjacent reliefs being equal to Δ/3 (or 3 mm for FIG. 4 and 5.5 mm for FIG. 5).

The A-weighted vibration velocity on the sheet shown in FIG. 4 is −68.5 dB (A). The A-weighted vibration velocity on the sheet shown in FIG. 5 ($d_{min}$=1.7 mm) is −71.8 dB (A). We also varied the distance between two adjacent reliefs with relief geometry corresponding to FIG. 5. It was observed that the A-weighted vibration velocity was −70.8 dB(A) at a distance of 3.7 mm and −69.7 dB(A) at a distance of 8.7 mm. With patterns of the same width and a length of 16 mm, it was observed that the A-weighted vibration velocity was −68 dBA at a distance of 6 mm.

Example 2

Figure 6:
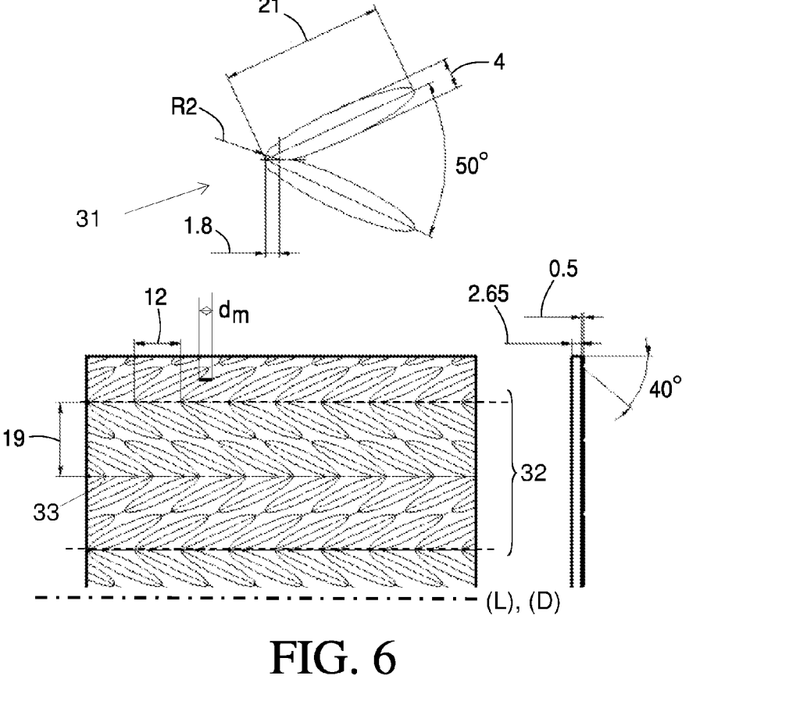
FIG. 6 shows a top view of another embodiment of the invention, which is a rolled sheet having aligned groups of chevrons, wherein said aligned groups are arranged alternately with chevrons facing forwards and chevrons facing backwards.

Sheet with Chevron-Shaped Reliefs Aligned Along (L) (FIG. 6)

The sheets in this example have, on one of their faces, a plurality (32) of aligned groups of reliefs with the general shape of a chevron (31) whose axis of symmetry is parallel to the direction of rolling (L). The chevron-shaped reliefs are arranged in aligned groups of reliefs of the same shape and the same orientation, the minimum distance $d_m$ between two adjacent reliefs of the same group, measured in said direction of rolling, being about 4 mm. In this example shown in FIG. 6, the plurality (32) of aligned groups of chevron-shaped reliefs facing backwards alternates with a plurality of aligned groups (33) of chevron-shaped reliefs facing forwards.

The chevron is made of wings which are joined at a convergence zone. In order for this wing convergence zone to be properly formed during the rolling process, it is advantageous to extend the cylinder engraving at this level by drilling a cylindrical hole of diameter a little greater than the width of the convergence zone in the direction of rolling.

The A-weighted vibration velocity on the sheet shown in FIG. 6 is −69.4 dB (A). We also varied the distance between two adjacent chevrons. It was observed that the A-weighted f vibration velocity was −68.8 dB(A) for a minimum distance of 5 mm and −67.6 dB(A) for a minimum of 6 mm.

Example 3

Figure 7:
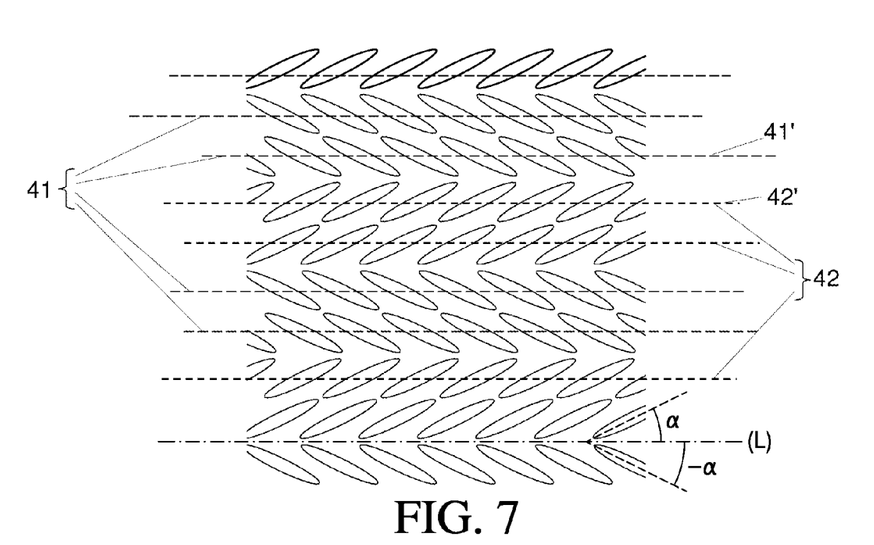
FIG. 7 shows a top view of another embodiment of the invention, which is a rolled sheet having aligned groups of semi-ovoids, the major axis of which is tilted at an angle of approximately 25° relative to the direction of rolling, two adjacent aligned groups being symmetrical to each other with respect to an axis parallel to the direction of rolling.

FIG. 7

The sheets in this example have at least one first plurality (41) of aligned groups whose reliefs have a larger tilted dimension at an angle of 25° relative to the direction of rolling and a second plurality (42) of aligned groups whose reliefs have a larger tilted dimension at an angle of −25° relative to the direction of rolling. The first plurality (41) of aligned groups and the second plurality (42) of aligned groups are arranged in such a way that two adjacent aligned groups ((41') and (42')), each belonging to a different plurality of aligned groups ((41) and (42) respectively), are symmetrical to each other with respect to an axis of symmetry parallel to the direction of rolling.

Example 4

Figure 8:
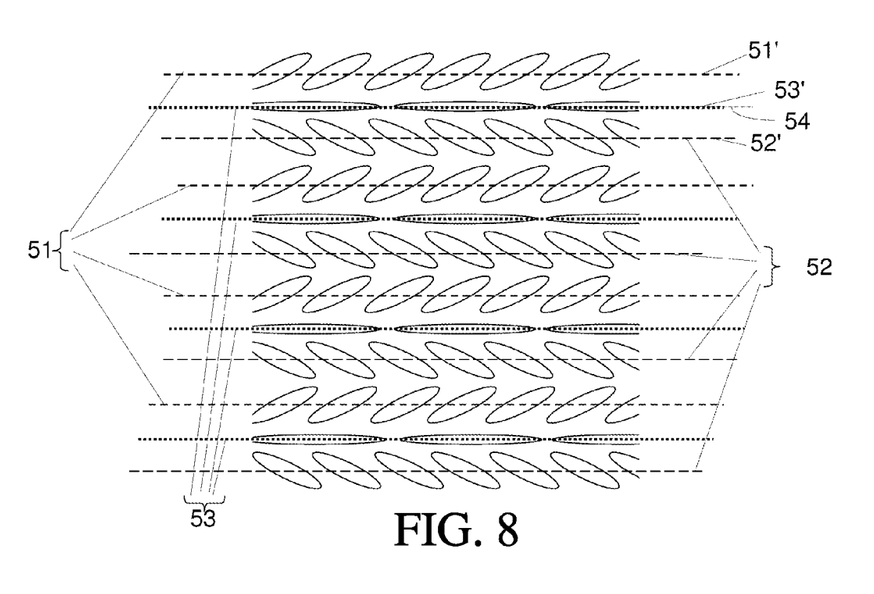
FIG. 8 shows a top view of another embodiment of the invention, where the aligned groups adjacent to tilted semi-ovoids, similar to those in FIG. 7, are separated by an aligned group of semi-ovoids oriented in the direction of rolling.

FIG. 8

The sheets in this example include a first plurality (53) of aligned groups of reliefs having a first semi-ovoid shape elongated in direction (L), a second plurality (51) of aligned groups of reliefs having a second semi-ovoid shape and tilted at an angle of 25° relative to the direction of rolling (L) and a third plurality (52) of aligned groups of reliefs of the same second semi-ovoid shape tilted at an angle of −25° to the direction of rolling (L). The pluralities of aligned groups are arranged so that three adjacent aligned groups (51', 53', 52') belong respectively to the second plurality of aligned groups (51), to the first plurality of aligned groups (53) and the third plurality of aligned groups (52). The second aligned group (51') and the third aligned group (52') are symmetrical to each other along an axis of symmetry (54) parallel to the direction of rolling (L). The third aligned group (53') is located on said axis of symmetry.

Example 5

Figure 9:
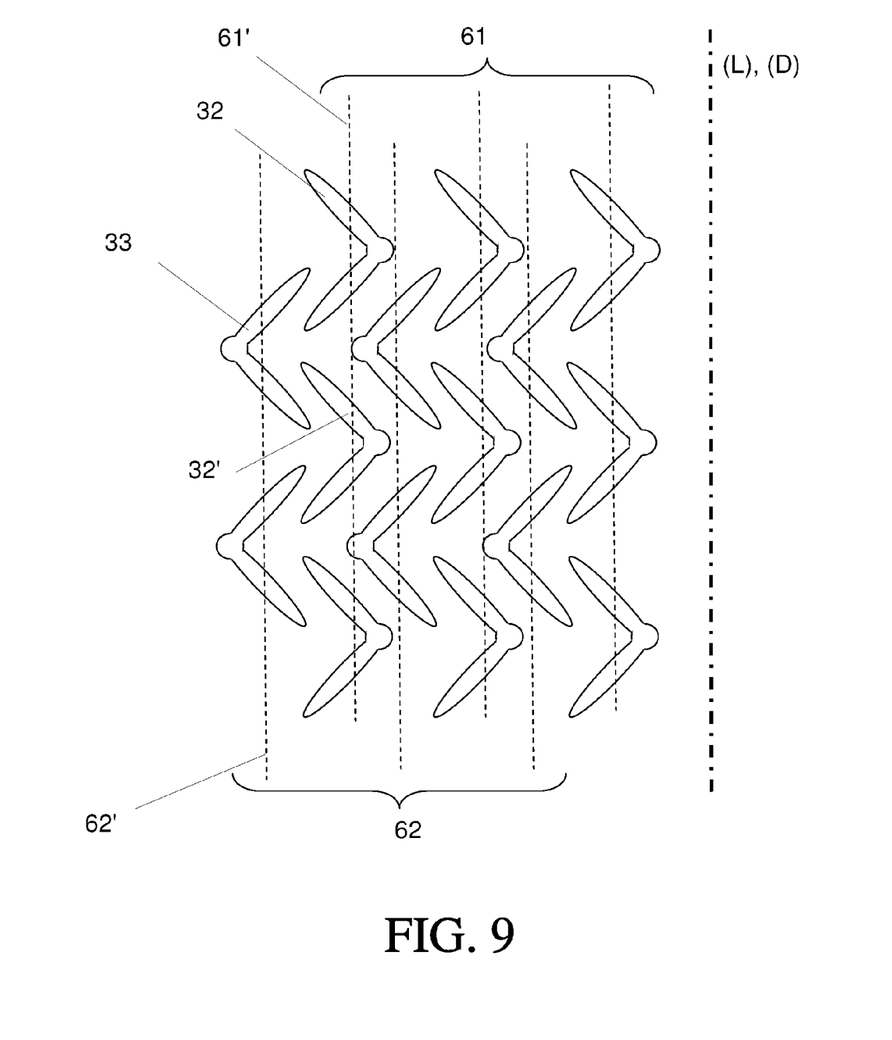
FIG. 9 shows a top view of another embodiment of the invention, which is a rolled sheet having two pluralities of aligned groups of chevrons, wherein said aligned groups are arranged alternately, one with chevrons facing to the right and the other with chevrons facing to the left.

Sheet with Open Chevron-Shaped Reliefs Aligned Along (L) (FIG. 9)

The sheets in this example have on one of their faces two pluralities (61 and 62) of aligned groups of reliefs with the general shape of a chevron (32 and 33 respectively) whose axis of symmetry is perpendicular to the direction of rolling (L). Said chevron-shaped reliefs are arranged in aligned groups of reliefs of the same shape and the same orientation. In the first aligned group (61'), the chevrons (32) are facing to the right. In the second aligned group (62'), the chevrons (33) are facing to the left. The center of gravity of the chevron (33) of an aligned group (62') is located on the bisector of the segment which joins the centers of gravity of two chevrons (32, 32') of an adjacent aligned group (61'). In this way, it is possible to obtain two adjacent aligned groups close to one another.

The invention claimed is:

1. Sheet metal plate for making floors, on which trucks are to run, said sheet having on its upper surface, a plurality of patterns, each pattern comprising one or more protrusions, called reliefs, said patterns being arranged periodically and discretely, the maximum height of said reliefs being between 0.2 and 1.5 mm, said reliefs having a friction surface, which is defined by the intersection of a relief with a plane (P) parallel to the surface of the sheet and located midway between the top and bottom of said relief and which, regardless of the direction in which it is measured, has an average width of at least 0.7 mm, characterized in that it comprises more than 3000 reliefs per $m^2$, where said reliefs are arranged in a plurality of aligned groups, wherein the reliefs of each of said aligned groups have the same shape, the same orientation, and have their centers of gravity substantially aligned in a first direction, the minimum distance measured along said first direction between two adjacent reliefs of the same aligned group is always less than 6 mm, said aligned groups being so arranged that the minimum distance in the direction perpendicular to the first direction between two adjacent reliefs of two different aligned groups is less than 15 mm.

2. Sheet according to claim 1, wherein the minimum distance measured along said first direction between two adjacent reliefs of the same aligned group is always less than 5 mm.

3. Sheet according to claim 1, comprising at least one plurality of aligned groups whose reliefs have a larger dimension slightly tilted with respect to said first direction, making a constant angle smaller than 30° with said first direction.

4. Sheet according to claim 3, wherein, when said angle is less than 2°, said largest dimension of said reliefs is greater than 16 mm.

5. Sheet according to claim 1, comprising at least a first plurality of aligned groups whose reliefs have a larger dimension tilted at an angle α relative to the first direction and a second plurality of aligned groups whose reliefs have a larger dimension tilted at an angle −α relative to the first direction.

6. Sheet according to claim 5, wherein said first plurality of aligned groups and said second plurality of aligned groups are arranged such that two adjacent aligned groups each belonging to a different plurality of aligned groups, are symmetrical to each other around an axis in the first direction.

7. Sheet according to claim 1, wherein the sheet is a rolled sheet made of aluminum alloy which has, on one of its faces, at least one plurality of reliefs arranged periodically, discretely, and in orderly fashion, said reliefs being in the form of a semi-ovoid, the ratio of the lengths of the major axis to the minor axis being between 2 and 15.

8. Sheet according to claim 7 wherein the maximum height of the reliefs is between 0.2 mm and 1.0 mm.

9. Sheet according to claim 7, wherein said sheet is made of an alloy belonging to the group comprising aluminum alloys of the 5xxx and 6xxx series according to the Aluminum Association designation and the 7xxx series alloys comprising less than 0.4% Cu.

10. Sheet according to claim 7, comprising aligned groups of said semi-ovoid shaped reliefs elongated in the direction of rolling (L), two adjacent reliefs being distant from each other by a minimum distance in the direction of rolling of between 2 and 6 mm, the distance between the axes of adjacent aligned groups being between 3 and 15 mm.

11. Sheet according to claim 10, wherein said groups are offset relative to each other such that the centers of gravity of the reliefs describe, in a crosswise direction, a zigzag line, the offset Δ in the direction of rolling (L) between the tops of the broken line remaining less than or equal to the major axis of the semi-ovoid.

12. Sheet according to claim 7, comprising aligned groups of said reliefs in the form of semi-ovoids tilted at an angle α in the direction of rolling (L) and aligned groups of reliefs of the same semi-ovoid shape tilted at an angle −α relative to the direction of rolling (L).

13. Sheet according to claim 7, comprising a first plurality of aligned groups of reliefs having a first semi-ovoid shape elongated in direction (L), a second plurality of aligned groups of reliefs having a second semi-ovoid shape and tilted at an angle α relative to the direction of rolling (L), and a third plurality of aligned groups of reliefs of the same second semi-ovoid shape tilted at an angle −α relative to the direction of rolling (L), said pluralities of aligned groups being arranged such that three adjacent aligned groups belong, respectively, to said second plurality of aligned groups, said first plurality of aligned groups, and said third plurality of aligned groups, the second and the third aligned group being symmetrical with each other around an axis of the first direction, the first aligned group being located on said axis of symmetry.

14. Sheet according to claim 1, wherein said sheet is a rolled sheet which has, on one side thereof, a plurality of reliefs arranged at regular and discrete intervals, said reliefs having the general shape of a chevron, whose axis of symmetry is parallel to the direction of rolling (L), the angle between the two wings of the chevron being less than 60°.

15. Sheet according to claim 14, wherein said chevron-shaped reliefs are arranged in aligned groups of reliefs of the same shape and the same orientation, the minimum distance (dm) between two adjacent reliefs of the same group, measured in said direction of rolling, being less than 6 mm.

16. Sheet according to claim 15, wherein aligned groups of chevron-shaped reliefs facing forwards alternate with aligned groups of chevron-shaped reliefs facing backwards.

17. Sheet according to claim 1, wherein the sheet is a rolled sheet which has, on one side thereof, a plurality of reliefs, arranged at regular, discrete, and orderly intervals, said reliefs having the general shape of a chevron, whose axis of symmetry is perpendicular to the direction of rolling (L), the angle between the two wings of the chevron being greater than 120°.

18. Sheet according to claim 17, wherein aligned groups of chevron-shaped reliefs facing to the left, alternate with aligned groups of chevron-shaped reliefs facing to the right.

19. Sheet according to claim 1, wherein the sheet is a rolled sheet which has, on one side thereof, a plurality of reliefs arranged at regular, discrete, and orderly intervals, said reliefs grouping n semi-ovoids, of which the ratio of the length of the major axis as compared to the minor axis is between 2 and 15, joined by (n−1) common vertices, where n is an integer between 1 and 10, tilted alternately by an angle α and an angle −α relative to the direction of rolling (L), α being less than 30°.

20. Sheet according to claim 1, wherein the surface fraction occupied by said reliefs is greater than 5%.

21. Sheet according to claim 1, for the production of floors on which trucks are to run in a general direction (Dc) and wherein the morphology, the number and layout of said reliefs are such that, when applying to said sheet the vibration measure test described below, the A-weighted vibration velocity ($Lv_A$) in the frequency range 20 Hz-5 kHz, is less than −67.5 dB(A) if the wheel used is a thermoplastic wheel with a rubber tire 10 cm in diameter running on said sheet along said general direction (Dc), said vibration measure test being performed in the following experimental conditions:
i) a specimen sheet is taken having a length in said direction (Dc) of at least 30 cm,
ii) a test bench is used, comprising:
ii1) an instrumented truck, made up of a board with three wheels: a rear wheel, located in the middle, near the rear edge of the board, and two front wheels identical to the rear wheel, in the vicinity of the front edge of the board, and near each side edge, said instrumented truck being loaded with 12.5 kg per wheel and comprising an accelerometer mounted on the rear wheel axle bearing;
ii2) a sample holder designed to receive said sample sheet and hold it firmly, while surrounding a track length of at least 30 cm which has its upper face provided with reliefs for said rear wheel to run on;
ii3) two smooth lateral tracks surrounding said sample-holder which are designed for the front wheels at the same height as the rear wheel;

iii) the truck is set in motion in such a way that, when the rear wheel arrives onto said strip of sheet metal, the truck is moving at a speed close to 1 m/s, iv) throughout the time that the rear wheel is on said track, the acceleration measured by said accelerometer is recorded as a time signal, a frequency analysis of said time signal is made, and the A-weighted vibration velocity (LvA) in the frequency range [f1-f2] is calculated, said A-weighted vibration velocity being given by the formula:

$$Lv_A = 10\log_{10}\left[\int_{f_2}^{f_1} \frac{V(f)^2}{V_0^2} pond_A(f)^2 df\right]$$

where V0 is the reference speed of 1 m/s, V(f) is the spectrum of the vibration velocity obtained from the recording of the acceleration time signal and pondA(f) is the frequency weighting A curve defined in standard EN61672-1.

22. Sheet according to claim 21, wherein the morphology, the number and layout of the said reliefs are such that, when applying to said sheet said vibration measure test, the A-weighted vibration velocity ($Lv_A$) in the frequency range 20 Hz-5 kHz is less than −68.0 dB(A), if the wheel is a thermoplastic wheel with a rubber tire of diameter 100 mm running on said sheet along said general direction (Dc).

23. Sheet according to claim 21, wherein the morphology, the number and layout of the said reliefs are such that, when applying to said sheet said vibration measure test, the A-weighted vibration velocity ($Lv_A$) in the frequency range 20 Hz-5 kHz obtained from a thermoplastic wheel with a rubber tire of diameter 100 mm running on said sheet in a direction perpendicular to said general direction (Dc) is higher than the A-weighted vibration velocity in the same frequency range obtained when the wheel runs in direction (Dc).

* * * * *